United States Patent
Yang et al.

(10) Patent No.: US 9,608,469 B2
(45) Date of Patent: Mar. 28, 2017

(54) METHOD FOR TRANSMITTING POWER WIRELESSLY, METHOD FOR RECEIVING POWER WIRELESSLY, WIRELESS POWER TRANSMITTING DEVICE, AND WIRELESS POWER RECEIVING DEVICE

(75) Inventors: Seungryul Yang, Seoul (KR); Beomjin Jeon, Seoul (KR); Jangwoong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 636 days.

(21) Appl. No.: 13/988,352

(22) PCT Filed: Dec. 8, 2011

(86) PCT No.: PCT/KR2011/009445
§ 371 (c)(1),
(2), (4) Date: May 20, 2013

(87) PCT Pub. No.: WO2012/081858
PCT Pub. Date: Jun. 21, 2012

(65) Prior Publication Data
US 2013/0234661 A1   Sep. 12, 2013

(30) Foreign Application Priority Data
Dec. 17, 2010 (KR) .................. 10-2010-0130030

(51) Int. Cl.
*H02J 7/00* (2006.01)
*H02J 7/02* (2016.01)
*H04W 12/06* (2009.01)

(52) U.S. Cl.
CPC ............ *H02J 7/025* (2013.01); *H02J 7/0013* (2013.01); *H02J 2007/0098* (2013.01); *H04W 12/06* (2013.01)

(58) Field of Classification Search
USPC .................................................. 320/135, 108
See application file for complete search history.

(56) References Cited

U.S. PATENT DOCUMENTS 7,222,177 B2 * 5/2007 Johnson ......................... 709/226
2009/0284220 A1 * 11/2009 Toncich et al. ............... 320/108
(Continued)

FOREIGN PATENT DOCUMENTS

KR   10-2008-0036702 A   4/2008
WO   WO 2010/080673 A1   7/2010
(Continued)

*Primary Examiner* — Robert Grant
(74) *Attorney, Agent, or Firm* — Birch, Stewart, Kolasch & Birch, LLP

(57) ABSTRACT

A wireless power transmitting device including a signal processing unit, a wireless transceiver, and a controller. The controller is configured to control a detection signal for detecting an external device to be transmitted via a wireless power transmitter, and if an authentication request signal is received from the external device in response to the detection signal, control an authentication response signal including an ID (Identification) assigned to the external device, and further, if a power profile signal including power amount information of the external terminal and change information indicating whether the power amount information is changed is received from the external terminal, control an allocation signal including wireless power allocation information indicating an allocated slot, determined based on the power amount information, to the external terminal.

19 Claims, 9 Drawing Sheets

(56) References Cited

U.S. PATENT DOCUMENTS

2010/0036773 A1* 2/2010 Bennett .......................... 705/67
2010/0253281 A1* 10/2010 Li ................................. 320/108
2010/0281261 A1* 11/2010 Razzell ......................... 713/171
2010/0289450 A1   11/2010 Kook
2011/0320828 A1* 12/2011 Boss et al. .................... 713/300

FOREIGN PATENT DOCUMENTS

WO    WO 2010/104803 A1   9/2010
WO    WO 2010/118161 A2  10/2010

* cited by examiner $$f_0 = \frac{1}{2\pi\sqrt{L_1 C_1}}$$

FIG. 5A

| AUTHENTICATION REQUEST SLOT NUMBER | ID INFORMATION |
|---|---|

FIG. 5B

| CHANGE INFORMATION | FIRST PROFILE | SECOND PROFILE | THIRD PROFILE | FOURTH PROFILE |
|---|---|---|---|---|

METHOD FOR TRANSMITTING POWER WIRELESSLY, METHOD FOR RECEIVING POWER WIRELESSLY, WIRELESS POWER TRANSMITTING DEVICE, AND WIRELESS POWER RECEIVING DEVICE

FIELD OF THE INVENTION

The present invention relates to a method for transmitting power wirelessly, a method for receiving power wirelessly, a wireless power transmitting device, and a wireless power receiving device and, more particularly, to a method for transmitting power wirelessly, a method for receiving power wirelessly, a wireless power transmitting device, and a wireless power receiving device specifies a communication relation between the wireless power transmitting device and the wireless power receiving device.

BACKGROUND ART

In our everyday lives, almost all types of electrical and electronic appliances, mobile phones, office appliances and devices, and industrial appliances and devices use electric energy (or power) supplies from local generators via power lines (i.e., wired power supply). However, with the vast development in diverse types of mobile devices and with the extensive usage of such mobile devices, it has become apparent that such wired power supply is not the most appropriate power source for mobile devices. In case of the mobile phone, which is now considered as a necessity in our everyday lives, when all of the power charged in the batteries is consumed, it is difficult to easily recharge the batteries wherever the mobile device and its user is located. Additionally, with the increase in the number of LAP TOP computer users, problems related to power capacity and weight of the batteries are becoming a more critical and crucial issue. Accordingly, if energy supply can be provided wirelessly from the user's office or from the company, the advent of a revolutionary change in both economic and industrial aspects may be anticipated.

SUMMARY OF THE INVENTION

An object of the present invention is to provide a method enabling a wireless power transmitting device and at least one wireless power receiving device to transmit and receive wireless power to and from one another and to communicate with one another in order to do so according to the embodiment of the present invention.

The object of the present invention is to provide, in a wireless power transmitting device wirelessly transmitting power, the wireless power transmitting device, which may include a signal processing unit processing a communication signal in order to communicate with an external device; a wireless power transmitter outputting predetermined wireless power to the external device, and communicating the communication signal with the external device; a controller controlling the signal processing unit, so as to generate a detection signal for detecting an external device and to output the generated detection signal to the wireless power transmitter, and, when an authentication signal respective to the detection signal is received, to allocate an ID to the external device, which has outputted the authentication signal, based upon a received time of the authentication signal, to generate the communication signal having the ID for outputting the communication signal to the external device, thereby outputting the generated communication signal to the wireless power transmitter, and controlling the signal processing unit, so as to determine whether or not to allocate the wireless power to the external device based upon charge-related information, when the charge-related information is received from the external device having the ID allocated thereto, and, based upon the determined result, to generate wireless power allocation information respective to whether or not a predetermined amount of the wireless power is allocated in order to be outputted to the external device, thereby outputting the generated wireless power allocation information to the wireless power transmitter.

Herein, the detection signal may include a sync signal being outputted to an external target at each predetermined time interval. And, the controller may control the wireless power transmitter, so that the wireless power can be transmitted to the external device based upon the allocation of the wireless power. And, the charge-related information may include at least one of power amount information requested by the external device and change information respective to a change in the charge-related information, and the power amount information may include at least one of operation mode power amount information required for an operation of the external device and at least one charge mode power amount information required for charging the external device.

Additionally, when the authentication signal is received from a plurality of external devices, the controller may allocate the ID to each of the plurality of external devices, and when each of the charge-related information is received from the plurality of external devices, priority levels may be assigned to the plurality of external devices based upon the charge-related information, and the allocation information may be decided in accordance with the priority levels. Herein, the charge-related information may include at least one of operation mode power amount information required for operating the external device and at least one charge mode power amount information required for charging the external device, and the controller may set up the priority level, so that, among the plurality of external devices, the external device having the operation mode power amount information can have a higher priority level than the external device having only the charge mode power amount information, and controls the signal processing unit and the wireless power transmitter, so that information on the priority level can be generated and outputted to the external device. Furthermore, when a plurality of external devices having the operation mode power amount information is provided, among the external devices, the external device having the ID allocated thereto firsthand may be given a priority level.

Meanwhile, the object of the present invention is to provide, in a wireless power transmitting method wirelessly transmitting power, the wireless power transmitting method, which may include outputting a detection signal in order to detect an external device; receiving an authentication signal respective to the detection signal; allocating an ID to an external device having outputted the authentication signal, based upon a reception time of the authentication signal, and outputting the ID to the external device; receiving charge-related information from the external device having the ID allocated thereto; determining whether or not wireless power is to be allocated to the external device based upon the charge-related information, and, based upon the determined result, outputting the wireless power allocation information respective to whether or not the wireless power is allocated to the external device.

Herein, the detection signal may include a sync signal being outputted to an external target at each predetermined time interval. And, the charge-related information may include at least one of power amount information requested by the external device and change information respective to a change in the charge-related information, and the power amount information may include at least one of operation mode power amount information required for an operation of the external device and at least one charge mode power amount information required for charging the external device, and the outputting the ID to the external device includes allocating each ID to the plurality of external devices, when the authentication signal is received from the plurality of external devices, and the receiving charge-related information may include receiving the charge-related information from the plurality of external devices, and the determining whether or not wireless power is to be allocated to the external device may include assigning a priority level to the plurality of external device, based upon the charge-related information, and deciding the allocation information in accordance with the priority levels, and the charge-related information may include at least one of operation mode power amount information required for an operation of the external device and at least one charge mode power amount information required for charging the external device, and, among the plurality of external devices, the external device having the operation mode power amount information may have a higher priority level than the external device having only the charge-related power amount information.

Additionally, when a plurality of external devices having the operation mode power amount information is provided, among the external devices, the external device having the ID allocated thereto firsthand may be given a priority level.

Meanwhile, in a wireless power receiving device wirelessly receiving power according to the present invention, provided herein is the wireless power receiving device, which may include a signal processing unit processing a communication signal in order to communicate with an external device; a wireless power receiver receiving predetermined wireless power from the external device, and selectively the communication signal to and from the external device; a controller controlling the signal processing unit, so as to, when a predetermined detection signal is received from the external device, generate an authentication signal respective to the detection signal and to output the generated authentication signal to the wireless power receiver, and controlling the signal processing unit, so as to, when an ID is allocated and received from the external device, based upon the authentication signal, generate charge-related information and to output the generated charge-related information to the wireless power receiver, and controlling the wireless power receiver, when wireless power allocation information respective to an allocation amount of the wireless power is received from the external device based upon the charge-related information, so as to receive the wireless power based upon the wireless power allocation information.

Additionally, the charge-related information may include at least one of power amount information requested by the external device and change information respective to a change in the charge-related information, and the power amount information may include at least one of operation mode power amount information required for an operation of the external device and at least one charge mode power amount information required for charging the external device.

Meanwhile, in a wireless power receiving method wirelessly receiving power according to the present invention, provided herein is the wireless power receiving method, which may include receiving a detection signal from a predetermined external device; outputting an authentication signal respective to the detection signal to the external device; being allocated with an receiving a predetermined ID based upon the authentication signal from the external device; outputting charge-related information to the external device; receiving wireless power allocation information respective to an allocated amount of wireless power from the external device based upon the charge-related information; receiving the wireless power based upon the wireless power allocation information.

Furthermore, the charge-related information may include at least one of power amount information requested by the external device and change information respective to a change in the charge-related information, and the power amount information may include at least one of operation mode power amount information required for an operation of the external device and at least one charge mode power amount information required for charging the external device.

A method enabling the wireless power transmitting device and the at least one wireless power receiving device according to the present invention to transmit and receive wireless power to and from one another and an efficient communication method for the same may be provided.

Additionally, the wireless power transmitting device according to the present invention may receive a power profile signal having communication-related information from multiple wireless power receiving devices, and, then, based upon each power profile signal and/or a location at which each wireless power receiving device is placed, the wireless power transmitting device may decide a priority level for each wireless power receiving device and may respectively allocate (or assign) wireless power thereto. Accordingly, the wireless power transmitting device according to the present invention may efficiently allocate (or assign) and transmit a limited amount of available wireless power to the wireless power receiving device.

BRIEF DESCRIPTION OF THE DRAWINGS

FIG. 5a illustrates a packet structure of an authentication response signal, and FIG. 5b illustrates a packet structure of a power profile signal.

DETAILED DESCRIPTION OF EMBODIMENTS OF THE INVENTION

Figure 1:
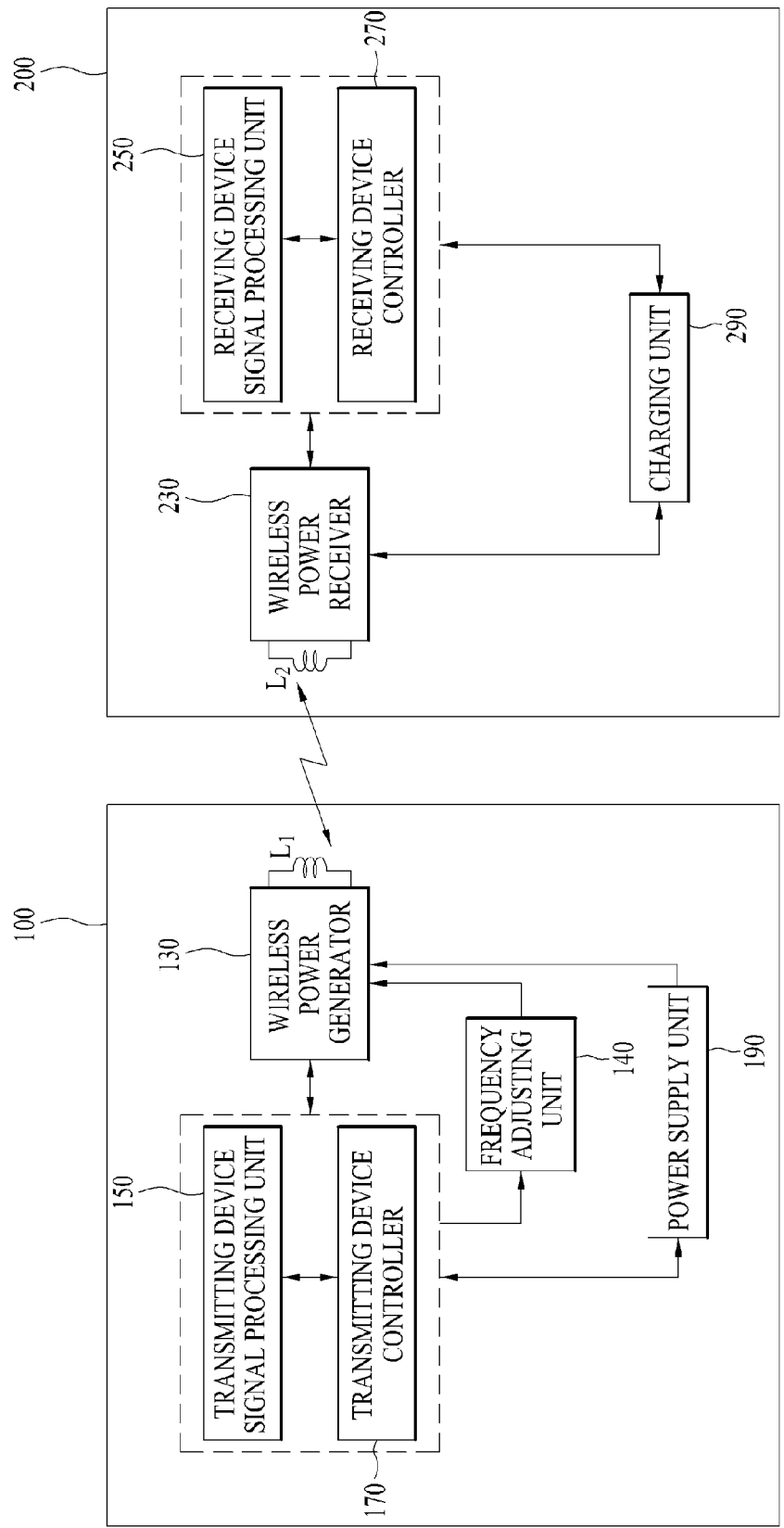
FIG. 1 illustrates a block view showing a wireless power transmitting device and a wireless power receiving device according to the present invention.

The object of the present invention is to provide, in a wireless power transmitting device wirelessly transmitting power, the wireless power transmitting device, which may include a signal processing unit processing a communication signal in order to communicate with an external device; a wireless power transmitter outputting predetermined wireless power to the external device, and transmitting and receiving the communication signal to and from the external device; a controller controlling the signal processing unit, so as to generate a detection signal for detecting an external device and to output the generated detection signal to the wireless power transmitter, and, when an authentication signal respective to the detection signal is received, to allocate an ID to the external device, which has outputted the authentication signal, based upon a received time of the authentication signal, to generate the communication signal having the ID for outputting the communication signal to the external device, thereby outputting the generated communication signal to the wireless power transmitter, and controlling the signal processing unit, so as to determine whether or not to allocate the wireless power to the external device based upon charge-related information, when the charge-related information is received from the external device having the ID allocated thereto, and, based upon the determined result, to generate wireless power allocation information respective to whether or not a predetermined amount of the wireless power is allocated in order to be outputted to the external device, thereby outputting the generated wireless power allocation information to the wireless power transmitter.

Herein, the detection signal may include a sync signal being outputted to an external target at each predetermined time interval. And, the controller may control the wireless power transmitter, so that the wireless power can be transmitted to the external device based upon the allocation of the wireless power. And, the charge-related information may include at least one of power amount information requested by the external device and change information respective to a change in the charge-related information, and the power amount information may include at least one of operation mode power amount information required for an operation of the external device and at least one charge mode power amount information required for charging the external device.

Additionally, when the authentication signal is received from a plurality of external devices, the controller may allocate the ID to each of the plurality of external devices, and when each of the charge-related information is received from the plurality of external devices, priority levels may be assigned to the plurality of external devices based upon the charge-related information, and the allocation information may be decided in accordance with the priority levels. Herein, the charge-related information may include at least one of operation mode power amount information required for operating the external device and at least one charge mode power amount information required for charging the external device, and the controller may set up the priority level, so that, among the plurality of external devices, the external device having the operation mode power amount information can have a higher priority level than the external device having only the charge mode power amount information, and controls the signal processing unit and the wireless power transmitter, so that information on the priority level can be generated and outputted to the external device. Furthermore, when a plurality of external devices having the operation mode power amount information is provided, among the external devices, the external device having the ID allocated thereto firsthand may be given a priority level.

Meanwhile, the object of the present invention is to provide, in a wireless power transmitting method wirelessly transmitting power, the wireless power transmitting method, which may include outputting a detection signal in order to detect an external device; receiving an authentication signal respective to the detection signal; allocating an ID to an external device having outputted the authentication signal, based upon a reception time of the authentication signal, and outputting the ID to the external device; receiving charge-related information from the external device having the ID allocated thereto; determining whether or not wireless power is to be allocated to the external device based upon the charge-related information, and, based upon the determined result, outputting the wireless power allocation information respective to whether or not the wireless power is allocated to the external device.

Herein, the detection signal may include a sync signal being outputted to an external target at each predetermined time interval. And, the charge-related information may include at least one of power amount information requested by the external device and change information respective to a change in the charge-related information, and the power amount information may include at least one of operation mode power amount information required for an operation of the external device and at least one charge mode power amount information required for charging the external device, and the outputting the ID to the external device includes allocating each ID to the plurality of external devices, when the authentication signal is received from the plurality of external devices, and the receiving charge-related information may include receiving the charge-related information from the plurality of external devices, and the determining whether or not wireless power is to be allocated to the external device may include assigning a priority level to the plurality of external device, based upon the charge-related information, and deciding the allocation information in accordance with the priority levels, and the charge-related information may include at least one of operation mode power amount information required for an operation of the external device and at least one charge mode power amount information required for charging the external device, and, among the plurality of external devices, the external device having the operation mode power amount information may have a higher priority level than the external device having only the charge-related power amount information.

Additionally, when a plurality of external devices having the operation mode power amount information is provided, among the external devices, the external device having the ID allocated thereto firsthand may be given a priority level.

Meanwhile, in a wireless power receiving device wirelessly receiving power according to the present invention, provided herein is the wireless power receiving device, which may include a signal processing unit processing a communication signal in order to communicate with an external device; a wireless power receiver receiving predetermined wireless power from the external device, and selectively the communication signal to and from the external device; a controller controlling the signal processing unit, so as to, when a predetermined detection signal is received from the external device, generate an authentication signal respective to the detection signal and to output the generated authentication signal to the wireless power receiver, and controlling the signal processing unit, so as to, when an ID is allocated and received from the external device, based upon the authentication signal, generate charge-related information and to output the generated charge-related information to the wireless power receiver, and controlling the wireless power receiver, when wireless power allocation information respective to an allocation amount of the wireless power is received from the external device based upon the charge-related information, so as to receive the wireless power based upon the wireless power allocation information.

Additionally, the charge-related information may include at least one of power amount information requested by the external device and change information respective to a change in the charge-related information, and the power amount information may include at least one of operation mode power amount information required for an operation of the external device and at least one charge mode power amount information required for charging the external device.

Meanwhile, in a wireless power receiving method wirelessly receiving power according to the present invention, provided herein is the wireless power receiving method, which may include receiving a detection signal from a predetermined external device; outputting an authentication signal respective to the detection signal to the external device; being allocated with an receiving a predetermined ID based upon the authentication signal from the external device; outputting charge-related information to the external device; receiving wireless power allocation information respective to an allocated amount of wireless power from the external device based upon the charge-related information; receiving the wireless power based upon the wireless power allocation information.

Furthermore, the charge-related information may include at least one of power amount information requested by the external device and change information respective to a change in the charge-related information, and the power amount information may include at least one of operation mode power amount information required for an operation of the external device and at least one charge mode power amount information required for charging the external device.

MODE FOR CARRYING OUT THE PRESENT INVENTION

Hereinafter, the exemplary embodiments of the present invention will be described in detail, so that the exemplary embodiments of the present invention can be easily carried out by anyone having general knowledge in the technical field to which the present invention belongs with reference to the accompanying drawings.

Although the terms used in the present invention are selected from generally known and widely used terms, the terms used herein may also include terms selected by the applicant at his or her discretion. And, in this case, the meaning of such terms will be described in detail in relevant parts of the description herein. Therefore, it is required that the present invention is understood, not simply by the actual terms used but by the meaning of each term lying within.

Hereinafter, a wireless power transmitting device (100), which wirelessly transmits power, and a wireless power receiving device (200) according to exemplary embodiments of the present invention, which configure the present invention, will be described in detail. When assigning reference numerals to the elements (or parts) illustrated in each drawing, even though the corresponding element (or part) is illustrated in different drawings, wherever possible, the same reference numbers will be used throughout the drawings to refer to the same or like elements (or parts).

In the wireless power transmitting device (100) according to the embodiment of the present invention, a method for wirelessly supplying power to a wireless power receiving device (200), which is not connected to the wireless power transmitting device via wire (or power line) in order be directly supplied with power, may include a method of generating inductive power by using an Inductive Coupling method, and a method of generating resonance power by using a Resonance Coupling method.

According to the Inductive Coupling method, among two neighboring coils, when an intensity level of current flowing through a first coil is changed, a magnetic field is changed due to the changed current intensity. Accordingly, a magnetic flux flowing through a second coil is also changed, thereby generating an induced electromotive force in the second coil. More specifically, according to this method, the induced electromotive force may be generated by placing the two coils to be adjacent to one another without having to spatially move the two lines and by then changing the electric current of the first coil. In this case, the frequency characteristic is not significantly influenced. Nevertheless, depending upon an Alignment and Distance between the wireless power transmitting device and the wireless power receiving device (200) including each coil, power efficiency may be affected.

On the other hand, according to the Resonance Coupling method, among the changed amount of magnetic field, which is generated when a Resonance Frequency is applied to a first one of two coils, a portion of the changed amount of magnetic field is applied to a second coil of the same Resonance Frequency, thereby generating an induced electromotive force from the second coil. More specifically, according to this method, when the transmitting and receiving devices respectively resonate at the same frequency, electromagnetic waves are delivered through a near field. Therefore, energy cannot be delivered if the frequency is different. In this case, the frequency characteristic may be significantly influenced. However, the Alignment and Distance between the wireless power transmitting device and the receiving device including each coil may influence the power efficiency relatively less than the Inductive Coupling method.

Hereinafter, a method for efficiently transmitting wireless power to a wireless power transmitting system by using the Resonance Coupling method will be described in detail. Most particularly, as shown below in Equation 1, when using the Resonance Coupling method, the Resonance Frequency (f) may be decided based upon Inductance (L) and Capacitance (C), which configure the transmitting device and receiving device of the wireless power transmitting system.

$$f = \frac{1}{2\pi\sqrt{LC}}$$ Equation 1

FIG. 1 illustrates a block view showing a wireless power transmitting device (100) and a wireless power receiving device (200) according to the present invention.

As shown in FIG. 1, the wireless power transmitting device (100) may include a wireless power generator (130), a transmitting device signal processing unit (150), and a transmitting device controller (170).

The wireless power generator (130) may generate a predetermined amount of wireless power and may output the generated wireless power to an external wireless power receiving device (200), so as to recharge the external wireless power receiving device (200). Herein, the wireless power is generated by the above-described coupling method. More specifically, the wireless power may be generated by using any one of the Resonance Coupling method and the Induction Coupling method. However, an example of the wireless power being generated and transmitted by using Resonance Coupling method will be provided in the following description. Herein, the wireless power generator (130) may include a power transmitter for transmitting the wireless power to the wireless power receiving device (200). And, the power transmitter may include a transmitting coil (L1), and an electromotive force generated from the transmitting coil (L1) may be delivered to a receiving coil (L2) of the wireless power receiver (230), which will be described later on. Additionally, the wireless power generator (130) further includes at least one capacitor (C1), which is not shown in the drawing. And, the resonance frequency of the wireless power is decided by the transmitting coil and the capacitor. Moreover, the wireless power generator (130) outputs a communication signal along with or separate from a predetermined amount of wireless power to an external wireless power receiving device (200).

The transmitting device controller (170) controls the transmitting device signal processing unit (150) and the wireless power generator (130). More specifically, the transmitting device controller (170) may detect a size of the wireless power being generated from the wireless power generator (130), thereby being capable of adjusting the size of the wireless power. Herein, the transmitting device controller (170) may determine the size of the wireless power that is to be transmitted to the wireless power receiving device (200) based upon a message, i.e., a communication signal, which is received from the wireless power receiving device (200) and decoded by the transmitting device signal processing unit (150). And, when required, the transmitting device signal processing unit (150) may be controlled, so that a predetermined message, i.e., a communication signal, which is to be transmitted (or delivered) to the wireless power receiving device (200), can be generated.

The wireless power transmitting device (100) according to the present invention may further include a power supply unit (190) for supplying power to the wireless power generator (130). Herein, the transmitting device controller (170) and the transmitting device signal processing unit (150) may also be supplied with power from the power supply unit (190). And, the transmitting device controller (170) may determine the maximum amount of wireless power that can be transmitted to the wireless power receiving device (200) based upon the maximum amount of power that can be outputted from the wireless power generator (130). Herein, the power supply unit (190) of the wireless power transmitting device (100) may be included in a transmitting device main system unit (not shown) within the wireless power transmitting device (100). And, in addition to supplying power to the wireless power generator (130), the transmitting device signal processing unit (150), and the transmitting device controller (170), the transmitting device main system unit may include elements that can perform other diverse functions. For example, when required, the transmitting device main system unit may include a user interface unit, a power control unit for controlling the power supply of the power supply unit (190).

Additionally, when wireless power having a predetermined resonance frequency is transmitted to the wireless power receiving device (200), the wireless power transmitting device (100) according to the present invention may further include a frequency adjustment unit (140) for selectively (or optionally) adjusting a value of the corresponding resonance frequency. For example, the frequency adjustment unit (140) may include a motor that can adjust a distance of a capacitor included in the wireless power generator (130), so as to vary (or change) a capacity value of the capacitor, or a motor that can adjust a number of turns of the coil or a diameter of the coil, so as to vary (or change) a capacity value of the capacitor.

The wireless power receiving device (200) according to the present invention may include a wireless power receiver (230), a receiving device signal processing unit (250), and a receiving unit controller (270).

The wireless power receiver (230) may receive wireless power from the wireless power transmitting device (100), and, in order to do so, the wireless power receiver (230) may include a receiving unit resonance coil (L2) and a receiving device resonance capacitor (C2). Additionally, in case the wireless power has a predetermined resonance frequency, the resonance frequency of the receiving device resonance coil and the receiving device resonance capacitor is identical to the resonance frequency of a resonance signal, which is transmitted from the wireless power transmitting device (100).

Additionally, the receiving device signal processing unit (250) modulates and/or demodulates a communication signal for communicating with the wireless power transmitting device (100). More specifically, the receiving device signal processing unit (250) may decode a message, which is received from the wireless power transmitting device (100) and, then, generate and encode a message that is to be transmitted to the wireless power transmitting device (100), thereby outputting the processed message to the wireless power receiver (230). Accordingly, the wireless power receiver (230) may transmit a message to the transmitting coil (L1) through the receiving coil (L2).

The receiving device controller (270) may control the receiving device signal processing unit (250), so as to control the generation and encoding/decoding of the message. Additionally, by controlling the wireless power receiving unit (230), the receiving device controller (270) may control the wireless power receiving unit (230), so that the message generated from the receiving device signal processing unit (250) can be transmitted to the wireless power transmitting device (100). Moreover, the receiving device controller (270) may control the receiving device signal processing unit (250), so that information on the amount of power, voltage, and so on, required for the charging (or recharging) process can be received from a charging unit (290), which will be described in more detail later on, and so that a communication signal available for transmission to the wireless power transmitting device (100) can be generated by using a message having the corresponding information.

The wireless power receiving device (200) according to the present invention may further include a charging unit (290), which can be charged with the wireless power. The charging unit (290) may supply initial power to the wireless power receiver (230), the receiving device signal processing unit (250), and the receiving device controller (270). By using the initial power, the wireless power receiver (230), the receiving device signal processing unit (250), and the receiving device controller (270) may be operated, in case the wireless power is not received. Additionally, when the wireless power receiver (230) receives the wireless power from the wireless power transmitting device (100), the wireless power receiver (230) may transmit wireless power to the charging unit (290), so that the charging unit (290) can be charged. Herein, the charging unit (290) may be included in the receiving device main system unit, which is not shown. And, in addition to the charging unit (290), the receiving main system unit may include elements that can perform other diverse functions of the wireless power receiving device (200).

Figure 2:
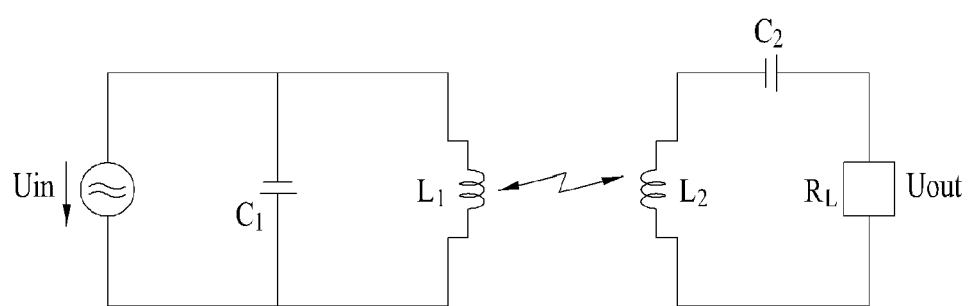
FIG. 2 illustrates a simplified circuit diagram of a wireless power generator and power of the wireless power transmitting device and a simplified circuit diagram of the wireless power receiving device receiving wireless power according to the present invention.

FIG. 2 illustrates a simplified circuit diagram of a wireless power generator (130) and a power supply unit (190) of the wireless power transmitting device (100) and a simplified circuit diagram of the wireless power receiving device (200) receiving wireless power according to the present invention. Herein, the transmitting coil (L1) and the receiving coil (L2) respectively operate as the first coil and the second coil of the induced electromotive force. Additionally, even when operation is performed in accordance with the resonance coupling method, the resonance frequency may be calculated by substituting the transmitting coil (L1) and the transmitting capacitor (C1) for the respective variables in Equation 1. The receiving coil (C2) and the receiving capacitor of the wireless power receiving device (200) may also have the same resonance frequency value. Therefore, the L1×C1 value may have the same vale as L2×C2.

Figure 3:
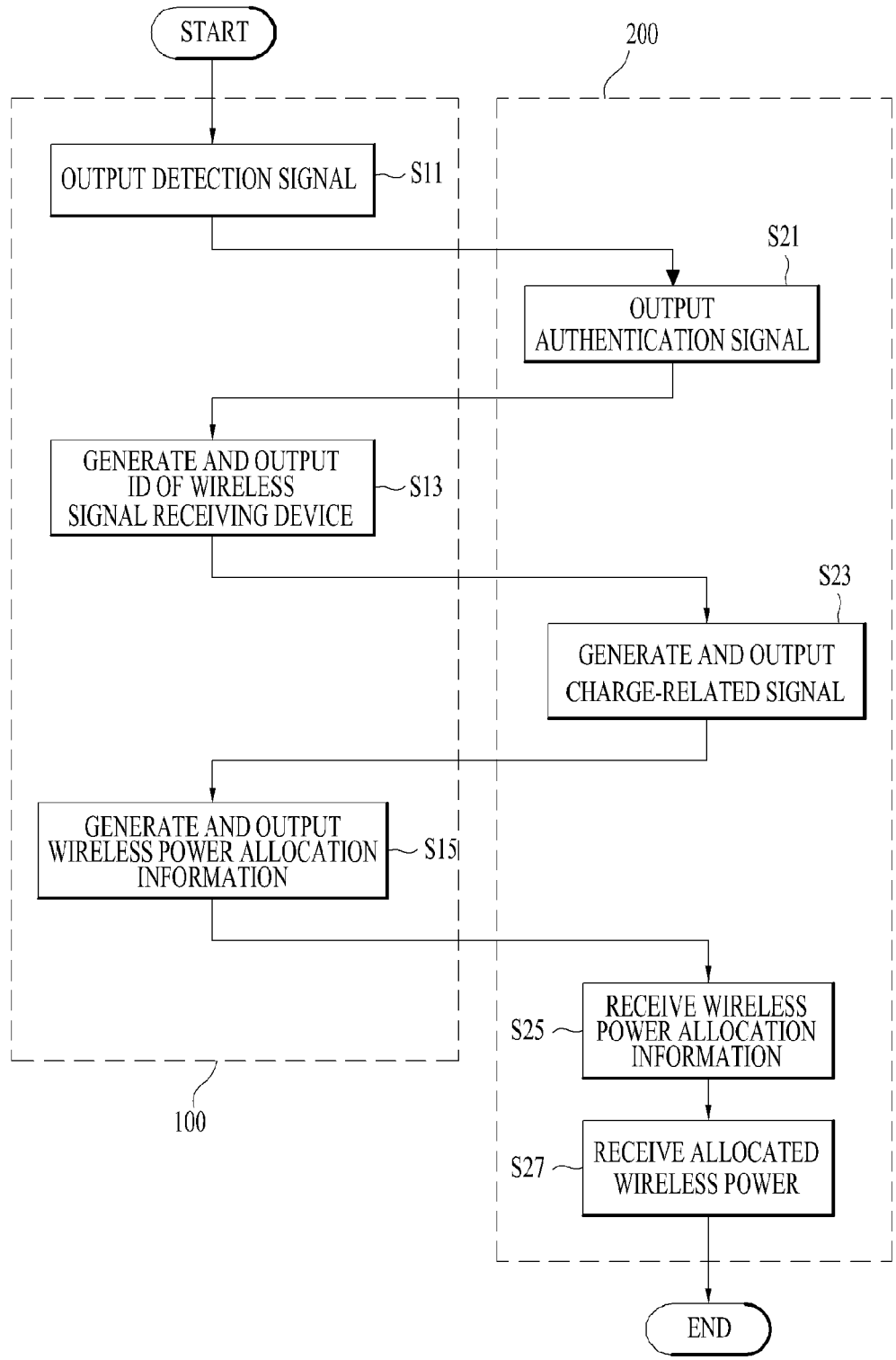
FIG. 3 illustrates a general view showing a communication procedure between a wireless power receiving device, which has not been authenticated by the wireless power transmitting device, and the wireless power transmitting device according to an exemplary embodiment of the present invention.

FIG. 3 illustrates a general view showing a communication procedure between a wireless power receiving device (200), which has not been authenticated by the wireless power transmitting device (100), and the wireless power transmitting device (100) according to an exemplary embodiment of the present invention.

The transmitting coil (L1) of the wireless power transmitting device (100) externally outputs a detection signal for detecting the wireless power receiving device (200) (S11). At this point, the detection signal may include at least one of a sync signal, which is being externally outputted at a predetermined time interval, and stand-by power for supplying initial power to an external device.

According to an exemplary embodiment of the present invention, when the detection signal corresponds to a sync signal, the wireless power transmitting device (100) periodically outputs a sync signal to an external target regardless of whether or not a wireless power receiving device (200) has been detected. At this point, when the wireless power receiving device (200) receives the sync signal, the receiving device controller (270) of the wireless power receiving device (200) may control the receiving device signal processing unit (250), so that an authentication request signal corresponding to the sync signal can be generated, and the receiving device controller (270) may also control the receiving device signal processing unit (250) and the wireless power receiver (230), which includes the receiving coil (L2), so that the generated authentication request signal can be outputted to the wireless power transmitting device (100) through the receiving coil (L2) (S21).

According to another embodiment of the present invention, in case the detection signal corresponds to the stand-by power, the wireless power transmitting device (100) consistently outputs stand-by power through the transmitting coil (L2). As a countermeasure for a case when the wireless power receiving device (200) is in a state of not being capable of communicating at all with the wireless power transmitting device (100) due to the absence of the stand-by power, i.e., for a case when the wireless power receiving device (200) has not even the least power to receive a sync signal and/or to transmit the authentication request signal, the wireless power transmitting device (100) may consistently output the stand-by power. Accordingly, in the wireless power receiving device (200), the receiving coil (L2) may receive the stand-by power. And, respectively, when the charging unit (290) of the wireless power receiving device (200) is partially charged and is, therefore, in a stand-by state, the wireless power receiving device (200) may send an authentication request signal to the wireless power transmitting device (100) (S21).

At this point, according to an embodiment of the present invention, even in a case when the wireless power receiving device (200) has transmitted an authentication request signal respective to the stand-by power to the wireless power transmitting device (100), in order to match the sync (or synchronization) between the wireless power receiving device (200) and the wireless power transmitting device (100), the wireless power transmitting device (100) may newly output a sync signal (S11), and the wireless power receiving device (200) may transmit an authentication request signal respective to the sync signal once again to the wireless power transmitting device (100) (S21).

Additionally, according to the embodiment of the present invention, the wireless power transmitting device (100) may periodically transmit a sync signal while consistently outputting stand-by power at the same time. At this point, when it is not absolutely required for the wireless power receiving device (200) to be charged with the stand-by power, the wireless power receiving device (200) may output an authentication request signal in accordance with the sync signal regardless of the stand-by power (S21). Meanwhile, when the wireless power receiving device (200) is required to be charged with the stand-by power, as described above in the embodiment of the present invention, the wireless power receiving device (200) may output a reserved authentication request signal based upon the stand-by power, and, then, the wireless power receiving device (200) may output the authentication request signal once again with respect to the sync signal (S21). Alternatively, a reserved authentication request signal based upon the stand-by power may be designed to be operated as the authentication request signal of step S21.

Meanwhile, in case the wireless power transmitting device (100) according to the present invention receives an authentication request signal from the wireless power receiving device (200), by controlling the transmitting device signal processing unit (150), the transmitting device controller may control the transmitting device signal processing unit (150), so that an authentication response signal can be generated from the wireless power receiving device (200) and outputted to the wireless power generator (130) (S13). Herein, the authentication response signal may include ID information of the wireless power receiving device (200). More specifically, the transmitting device controller (170) may allocate (or assign) an ID to the wireless power receiving device (200), and the transmitting device controller (170) may control the transmitting device signal processing unit (150) and the wireless power generator (130), so that the allocated ID information can be transmitted to the wireless power receiving device (200).

When the wireless power receiving device (200) receives the ID information, the receiving device controller (270) controls the receiving device signal processing unit (250), so that charge-related information (power profile information) can be generated and outputted to the wireless power receiver (s23). Herein, the charge-related information may include at least one of information on the amount of power required by the wireless power receiving device (200) (or required power amount information of the wireless power receiving device (200)) and change information on whether or not a change has occurred in the charge-related information. Additionally, the information on the required amount of power (or required power amount information) may include at least one of information on the amount of operation mode power (or operation mode power amount information) required for the operation of the wireless power receiving device (200) and information on the amount of at least one charge mode power (or charge mode power amount information) required for the charging (or recharging) of the wireless power receiving device (200).

When the above-described charge-related information is received, the transmitting device controller (170) of the wireless power transmitting device (100) controls the transmitting device signal processing unit (150), so as to determine whether or not wireless power is to be allocated (or assigned) by the wireless power transmitting device (100) to the wireless power receiving device (200) based upon the amount of wireless power that can be transmitted and the charge-related information, and to determine the amount of power that is to be allocated, when the wireless power transmitting device (100) decides to allocate the wireless power is decided, and then to generate wireless power allocation information that is related to the allocated on the wireless power based upon the determined results and to output the generated wireless power allocation information to the wireless power generator (130) (S15). The wireless power generator (130) may simultaneously output a communication signal along with a predetermined wireless power or may separately output the communication signal, and the communication signal may include the above-described wireless power allocation information.

The wireless power receiving device (200) may receive a communication signal having the wireless power allocation information through the receiving coil (L2) (S25). Accordingly, the wireless power receiving device (200) may receive an amount of wireless power corresponding to the allocation information from the wireless power transmitting device (100), thereby being capable of charging the charging unit (290) (s27).

Meanwhile, when multiple wireless power receiving devices (200) respectively transmit an authentication request signal to the wireless power transmitting device (100) and wish to receive wireless power from the wireless power transmitting device (100), the transmitting device controller (170) of the wireless power transmitting device (100) allocates (or assigns) an ID to each of the multiple wireless power receiving devices (200). When the charge-related information is received from each of the multiple wireless power receiving devices (200), the transmitting device controller (170) assigns priority levels among the multiple wireless power receiving devices (200) based upon the charge-related information received from each of the wireless power receiving devices (200). Thereafter, the transmitting device controller (170) may decide the allocation amount of the wireless power in accordance with the respective priority level and may then decide the respective allocation information. A method for deciding the priority levels between the multiple wireless power receiving devices (200) will be described in detail later on.

Figure 4:
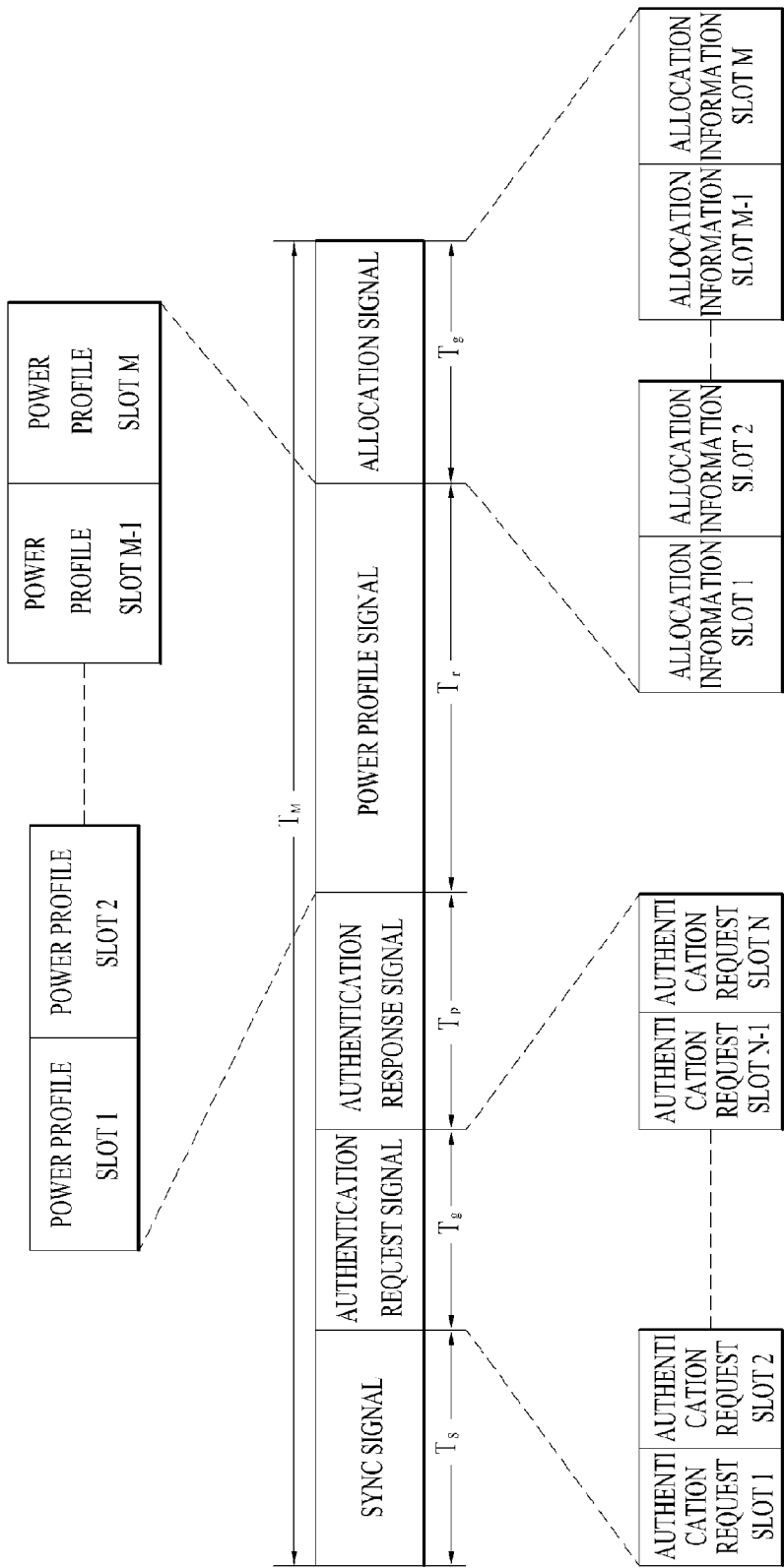
FIG. 4 illustrates a time-based alignment of communication steps between the wireless power transmitting device and the wireless power receiving device, when a sync signal is used as a detection signal.

FIG. 4 illustrates a time-based alignment of communication steps between the wireless power transmitting device and the wireless power receiving device (200), when a sync signal is used as a detection signal. More specifically, communication signals that are aligned in FIG. 4 may be transmitted and received during a specific cycle period (Tm), and such signals are repeated (or iterated) at the same specific cycle period (Tm).

The sync signal is outputted from the wireless power transmitting device (100) to a time slot corresponding to a first time (Ts). Additionally, the sync signal may be provided in a packet structure having a fixed sequence. When the sync signal is detected yet not authenticated by the wireless power transmitting device (100), the wireless power receiving device (200) transmits an authentication response signal to the wireless power transmitting device (100). At this point, a particular time at which the authentication response signal can be transmitted may be allocated as a second time (Tq) after receiving the sync signal. At this point, the second time may be divided into N number of time slots, i.e., authentication request slots, and the wireless power receiving device (200) that requests to be authenticated may arbitrarily select any one of the N number of time slots, so as to transmit an authentication request signal to the wireless power transmitting device (100). Accordingly, when the authentication request signal is inputted without any errors, the wireless power transmitting device (100) may allocate (or assign) an ID to the corresponding wireless power receiving device (200), so as to transmit the authentication response signal at a third time (Tp). At this point, the authentication response signal may have the same packet structure as that shown in FIG. 5a, which will be described in detail later on.

Additionally, when the authentication response signal is received, the wireless power receiving device (200) outputs a power profile signal having the above-described charge-related information to the wireless power transmitting device (100). At this point, a fourth time (Tr) may be allocated as the time for receiving the power profile signal, and the fourth time may be divided into M number of time slots, i.e., power profile slots. Moreover, among the M number of power profile slots, the wireless power receiving device (200) may determine a power profile slot to which it belongs based upon the ID, which is allocated from the wireless power transmitting device (100), and, then, the wireless power receiving device (200) may output the power profile signal having its charge-related information in the respective power profile slot to the wireless power transmitting device (100). The power profile signal may have the same packet structure as that shown in FIG. 5b, which will be described in detail later on. Herein, it is preferable that the M number of power profile slots matches with the maximum number of wireless power receiving devices (200), which can be simultaneously charged by the wireless power transmitting device (100).

After receiving the power profile signal, the wireless power transmitting device (100) may decide the amount of wireless power that is to be allocated to each wireless power receiving device (200), the priority level of each wireless power receiving device (200), and so on, based upon the charge-related information of the received power profile signal. Thereafter, the wireless power transmitting device (100) transmit an allocation signal, which includes allocation information based upon the decided amount of wireless power, priority level, and so on, to each of the wireless power receiving devices (200) at a fifth time (Tg). At this point, the fifth time may be divided into M number of time slots, i.e., allocation information slots. More specifically, it is preferable that the number of allocation information slots and the number of power profile slots are identical to one another, thereby being equal to M. Additionally, the wireless power transmitting device (100) determines the allocation information slot, to which each wireless power receiving device (200) belongs, from the M number of allocation information slots, based upon the ID being allocated to the wireless power receiving device (200), and also based upon the order of the power profile slot. Thereafter, each allocation signal may be transmitted to the wireless power receiving device (200) through the respective allocation information slot.

FIG. 5a illustrates a packet structure of an authentication response signal, and FIG. 5b illustrates a packet structure of a power profile signal.

The authentication response signal may include a section (or area) indicating an authentication request slot number and a section indicating the ID of the respective wireless power receiving device (200). Herein, the section indicating the ID of the respective wireless power receiving device (200) may indicate a respective power profile slot number and an allocation information slot number. Herein, the wireless power receiving device (200) may be informed and aware that the authentication request signal, which is transmitted through a specific authentication request slot, has been authenticated through the section indicating the authentication request slot number. And, after the authentication process, based upon the section indicating the ID, the wireless power receiving device (200) may determine a slot number for performing communication between the wireless power transmitting device (100) and the wireless power receiving device (200). Therefore, when 2 is allocated as the authentication request slot number, and when 1 is allocated as the power profile slot number and the allocation information slot number, the authentication response signal may include information, such as [2, 1].

The charge-related information of the power profile signal may include at least one of change information on whether or not a change has occurred in the charge-related information, and information ($1^{st}$ profile, $2^{nd}$ profile, $2^{nd}$ profile) on the amount of power required by the wireless power receiving device (200) (or required power amount information of the wireless power receiving device (200)). Additionally, the required power amount information may include at least one of information on the amount of operation mode power required for the operation of the wireless power receiving device (200) and information on the amount of at least one charge mode power required for the charging (or recharging) of the wireless power receiving device (200). More specifically, the change information indicates whether or not a change has occurred in a previous power profile signal and a current power profile signal. In other words, the sync signal may be periodically outputted at each specific cycle period (or interval) (Tm) time, as described above, and, accordingly, the wireless power receiving device (200) also periodically updates the power profile signal of the wireless power transmitting device (100). Therefore, information on whether or not the power profile signal of the previous cycle period is identical to the current power profile signal may also be included in the change information. Therefore, for example, in case the previous power profile signal is identical to the current power profile signal, "0" may be transmitted, and, in case the previous power profile signal and the current power profile signal are different from one another, "1" may be transmitted. Accordingly, 1 bit may be assigned to the change information, and the 1 bit may have the value of 1 or 0. In accordance with such change information, when the previous power profile signal is identical to the current power profile signal, the wireless power transmitting device (100) may reduce the time required for unnecessarily reading all of the profile signals. Additionally, when the previous power profile signal is identical to the current power profile signal, the wireless power receiving device (200) may choose not to separately output power amount information.

The power amount information may include at least one of operation mode power amount information and charge mode power amount information. The operation mode power amount information indicates the amount of power required for the operation of the corresponding wireless power receiving device (200). Therefore, even when the wireless power receiving device (200) is without battery, or when the battery of the wireless power receiving device (200) is out of power, the power amount respective to the operation mode power amount information may be received, thereby being capable of operating the wireless power receiving device (200). Additionally, the charge mode power amount information corresponds to information on the power amount (or amount of power) that is being charged to the battery. Herein, at least one power amount, e.g., Watt value, required for charging (or recharging) the battery of each wireless power receiving device (200) may be included in the charge mode power amount information.

Therefore, a first profile information of FIG. 5b may indicate the operation mode power amount information, and a second profile information to a fourth profile information may include the charge mode power amount information. And accordingly, the second profile information to the fourth profile information may respectively correspond to a slow charge mode, a normal (or general) charge mode, and a fast charge mode, and may be aligned by an order starting from slow to fast. Evidently, an alignment by an order starting from fast to slow may also be applied. However, an example of the profile information being aligned by the order starting from slow to fast will be given in the following description of the present invention. For example, when 10 Watts are required for operating the wireless power receiving device (200), and when the Watt values available for charging are 1 Watt, 3 Watts, and 5 Watts, the first profile information to the fourth profile information may sequentially be assigned with the Watt values of 10, 1, 3, 5. Meanwhile, when the operation mode power amount information is not separately transmitted, the first profile information to the fourth profile information of the corresponding wireless power transmitting device (100) may be sequentially assigned with the values of 0, 1, 3, 5. Alternatively, when the corresponding wireless power receiving device (200) does not submit the charge mode power amount information, the first profile information to the fourth profile information may be sequentially assigned with the values of 10, 0, 0, 0. However, only the value 10 corresponding to the operation mode power amount information, i.e., the first profile information may be transmitted.

Figure 6A:
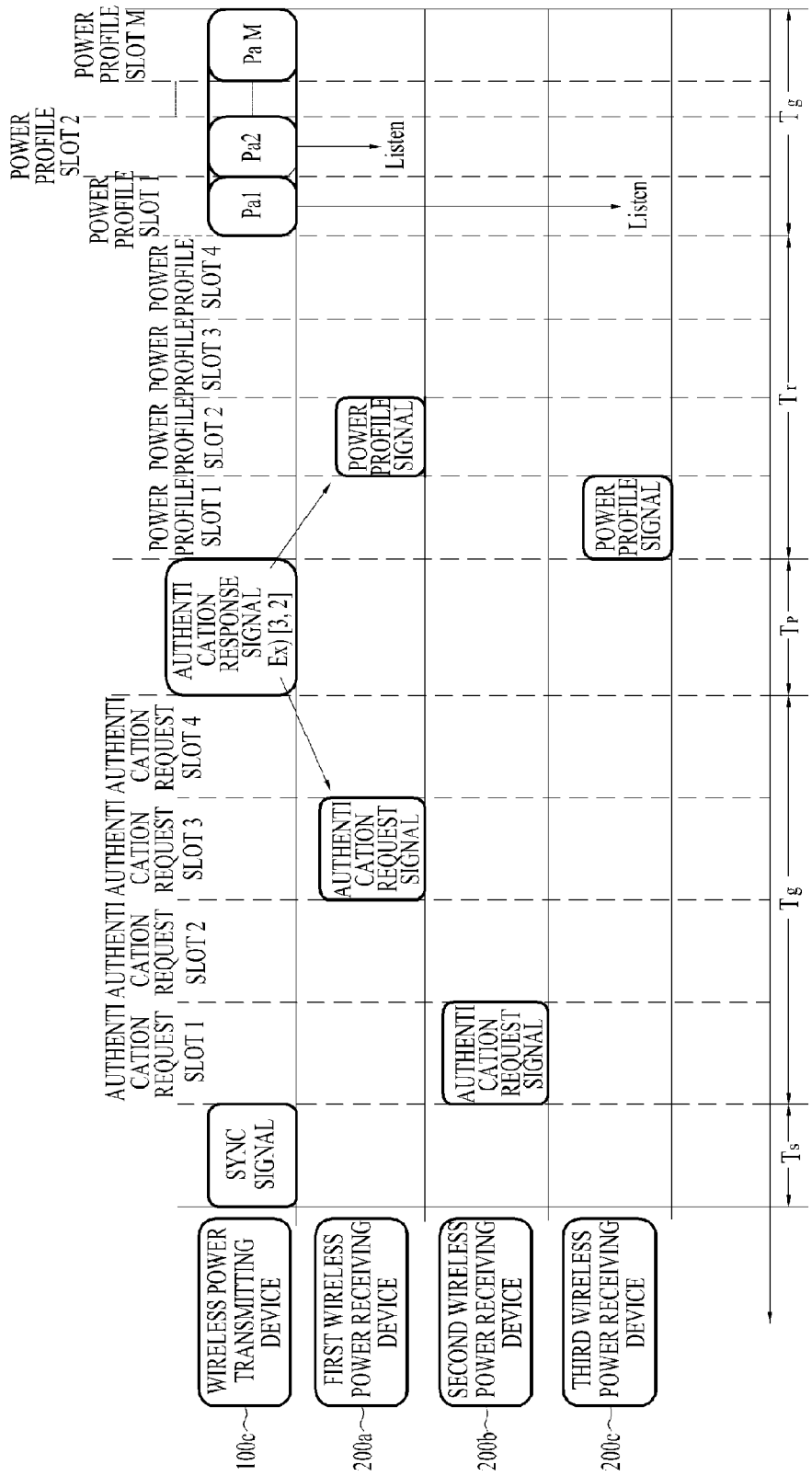
FIG. 6a and FIG. 6b illustrate a communication relation between the wireless power transmitting device and multiple wireless power receiving devices according to an exemplary embodiment of the present invention.
Figure 6B:
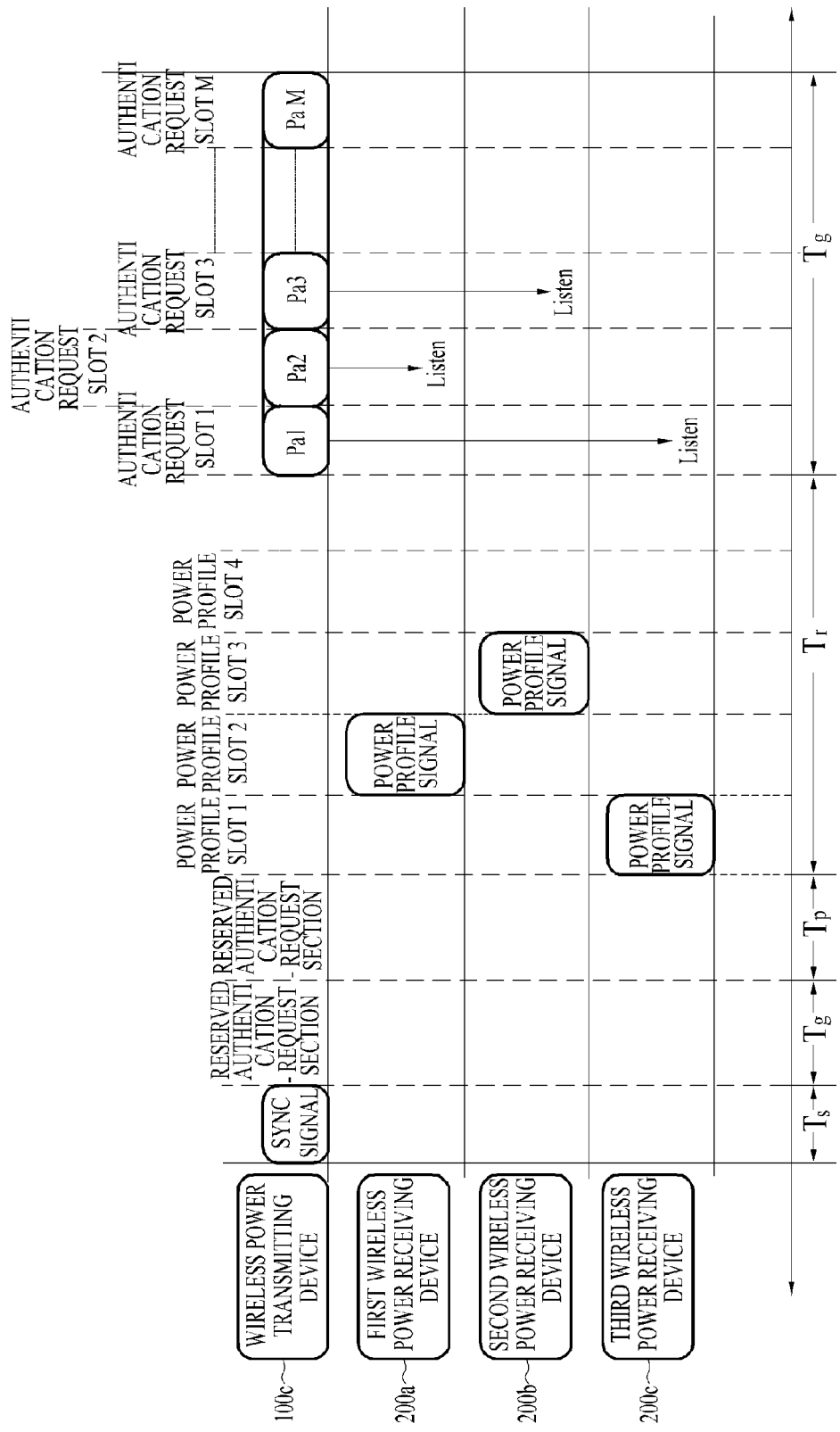

FIG. 6a and FIG. 6b illustrate a communication relation between the wireless power transmitting device (100) and multiple wireless power receiving devices (200) according to an exemplary embodiment of the present invention.

The wireless power transmitting device (100) outputs a sync signal at least cycle period T. Accordingly, wireless power receiving devices (200) that are not yet authenticated, i.e., a first wireless power receiving device (200a) and a second receiving device may respectively transmit an authentication request signal to an arbitrary time slot among a plurality of authentication request slots, thereby delivering the transmitted authentication request signal to the wireless power transmitting device (100). At this point, the authentication request signal of the first wireless power receiving device (200a) is delivered to the wireless power transmitting device (100) from authentication request slot 3, and the authentication request signal of the second wireless power receiving device (200b) is delivered to the wireless power transmitting device (100) from authentication request slot 1.

When the authentication request signal is received, the wireless power transmitting device (100) transmits an authentication response signal based upon the authentication request signal. At this point, as described above, the authentication response signal may include ID information, and, as shown in FIG. 5a, the authentication response signal may have a packet structure including a section indicating the authentication request slot number and a section indicating an ID of the wireless power receiving device (200).

Herein, when the first wireless power receiving device (200a) is authenticated without error, the wireless power transmitting device (100) transmits an authentication response signal to the first wireless power receiving device (200a) based upon an authentication request signal slot number, to which the first wireless power receiving device (200a) has sent the authentication request signal, and also based upon newly allocated ID information, i.e., power profile slot and allocation information slot numbers. More specifically, when the authentication request signal slot number of the authentication request signal, which is transmitted by the first wireless power receiving device (200a), corresponds to 3, and, when the allocated power profile slot and allocation information slot numbers correspond to 2, the wireless power transmitting device (100) transmits an authentication response signal having [3, 2] information to the first wireless power receiving device (200a).

Additionally, the second wireless power receiving device (200b) corresponds to a case when the authentication request signal has been transmitted through a first authentication request slot, yet not authenticated by the wireless power transmitting device (100). For example, due to diverse reasons, such as when multiple wireless power receiving devices (200) transmit an authentication request signal through the same authentication request slot, or when the wireless power transmitting device (100) is incapable of recognizing the transmitted authentication request signal due to a low intensity of the transmitted signal, the wireless power transmitting device (100) may not perform authentication even when a portion of the authentication request signal has been received. In this case, the wireless power transmitting device (100) does not separately transmit an authentication response signal to the second wireless power receiving device (200b). Accordingly, the second wireless power receiving device (200b) may wait until a sync signal is newly delivered and may then generate a new authentication request signal.

Herein, since a third wireless power receiving device (200c) has already passed the authentication procedure and, therefore, already assigned with an ID, the third wireless power receiving device (200c) does not output a separate authentication request signal and does not receive any authentication response signal. Therefore, the third wireless power receiving device (200c) does not transmit and receive any separate communication signals to and from the wireless power transmitting device during the second time (Tq) and the third time (Tp).

Once the authentication response signal transmitting and receiving time sections are passed, the authenticated wireless power receiving devices (200), i.e., the first wireless power receiving device (200a) and the second wireless power receiving device (200b) respectively generates a power profile signal and transmits the generated signal to the wireless power transmitting device (100). At this point, based upon the ID information allocated (or assigned) from the wireless power transmitting device (100), the first wireless power receiving device (200a) and the second wireless power receiving device (200b) respectively receives or transmits a communication signal through the corresponding power profile slot and allocation information slot.

FIG. 6a shows an example of power profile slot 2 and allocation information slot 2 being allocated (or assigned) to the first wireless power receiving device (200a) and power profile slot 1 and allocation information slot 3 being allocated (or assigned) to the third wireless power receiving device (200b). Therefore, during the third time (Tr), the wireless power transmitting device (100) determines that the signal being received in power profile slot 2 corresponds to the power profile signal received by the first wireless power receiving device (200a), and the wireless power transmitting device (100) determines that the signal being received in power profile slot 1 corresponds to the power profile signal received by the second wireless power receiving device (200b). Additionally, during the fourth time (Tg), the wireless power transmitting device (100) transmits an allocation signal (Pa2), which is to be transmitted to the first wireless power receiving device (200a), and the wireless power transmitting device (100) transmits an allocation signal (Pa1), which is to be transmitted to the third wireless power receiving device (200c).

Meanwhile, when all of the first wireless power receiving device (200a) to the third wireless power receiving device (200c) are authenticated after performing the above-described process steps, when the wireless power transmitting device (100) sends out a sync signal, as shown in FIG. 6b, each wireless power receiving device (200) does not receive and transmit any separate communication signal during the authentication request section (or period) and in the authentication response section (or period). Then, when the power profile slot is reached, each wireless power receiving device (200) receives a power profile signal in the power profile slot corresponding to its own ID. A wireless power receiving device (200), which has previously transmitted a power profile signal, may also update the charge-related information at each cycle period (or interval) T, so as to transmit the power profile signal.

Figure 7:
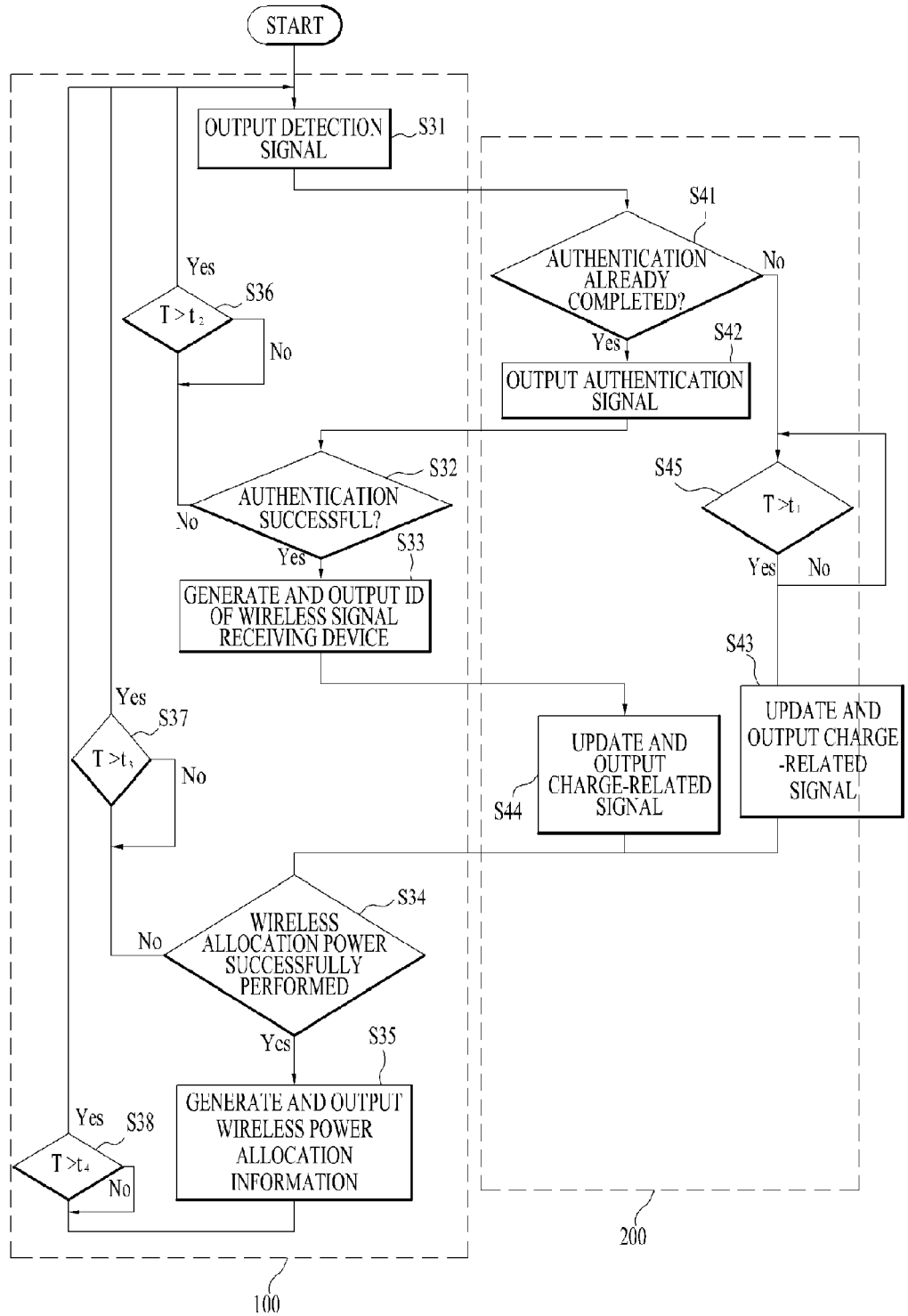
FIG. 7 illustrates a communication relation between the wireless power transmitting device and the wireless power receiving device based upon both cases when the wireless power receiving device has been authenticated and when the wireless power receiving device has not been authenticated.

FIG. 7 illustrates a communication relation between the wireless power transmitting device (100) and the wireless power receiving device (200) based upon both cases when the wireless power receiving device (200) has been authenticated and when the wireless power receiving device has not been authenticated.

The transmitting coil (L1) of the wireless power transmitting device (100) outputs a detection signal for detecting the wireless power receiving device (200) to an external target (S31). Hereinafter, an example of the detection signal corresponding to a sync signal, which is being outputted to an external target at each predetermined time cycle period (or interval) (Tm), will be described in detail.

When a wireless power receiving device (200) receives a sync signal, and when the corresponding wireless power receiving device (200) has already been authenticated (S41), the wireless power receiving device (200) controls the receiving device signal processing unit and the wireless power receiver (230) (S43), so that, after waiting for a predetermined period of time (S45), the charge-related information can be updated and that a power profile signal can be generated and outputted. Meanwhile, when the wireless power receiving device (200) corresponds to a wireless power receiving device (200) that can receive a sync signal and that has not been previously authenticated (S41), the receiving device controller (270) may control the receiving device signal processing unit (250) and the wireless power receiver (230), so that an authentication request signal can be generated and outputted (S42). When an authentication request signal is received, the transmitting device controller (170) of the wireless power transmitting device may authenticate the respective wireless power receiving device (200). At this point, when the wireless power receiving device (200) is authenticated without any separate errors (S32), the transmitting device controller (170) may control the transmitting device signal processing unit (150), so that an authentication response signal including ID information of the wireless power receiving device (200) can be generated and outputted to the wireless power generator (130) (S33). At this point, when the wireless power receiving device (200) is not authenticated (S32), after a predetermined period of time has elapsed (S36), the wireless power receiving device (200) waits until a sync signal is newly received.

Meanwhile, when the wireless power receiving device (200) receives the authentication response signal, the receiving device controller (270) controls the receiving device signal processing unit (250), so that the charge-related information can be updated and that a power profile signal can be generated, and, then, the receiving device controller (270) controls the wireless power receiver (230), so that the power profile signal generated by the receiving device signal processing unit (250) can be outputted (S44).

After receiving the power profile signal from the wireless power receiving device (200), the transmitting device controller (170) of the wireless power transmitting device (100) determines the charge-related information of each wireless power receiving device (200) (S34). Then, depending upon the determined result, the transmitting device controller (170) controls the transmitting device signal processing unit (150), so as to determine whether or not wireless power is to be allocated (or assigned), the allocation priority level, the allocated power amount of the wireless power, and so on of the wireless power receiving device (200), and so as to generate an allocation signal including allocation information respective to the determined information, and, then, the transmitting device controller (170) controls the wireless power generator (130), so that the generated allocation signal can be outputted (S35). Accordingly, the wireless power receiver (230) receives an amount of allocated wireless power based upon the allocation information included in the allocation information slot, which is allocation to each of the wireless power receiving devices (200).

At this point, the wireless power receiving device (200) may adjust the load of the wireless power receiver (230), so as to be capable of receiving the amount of wireless power assigned to the wireless power receiving device (200) itself. Alternatively, the wireless power receiver (230) of the wireless power receiving device (200) may include a switching device, so as to be controlled to receive as much as the allocated amount of wireless power. More specifically, the receiving device controller (270) of the wireless power receiving device (200) may adjust the on/off time of the switching device of the wireless power receiver (230), thereby adjusting the received amount of wireless power.

Figure 8:
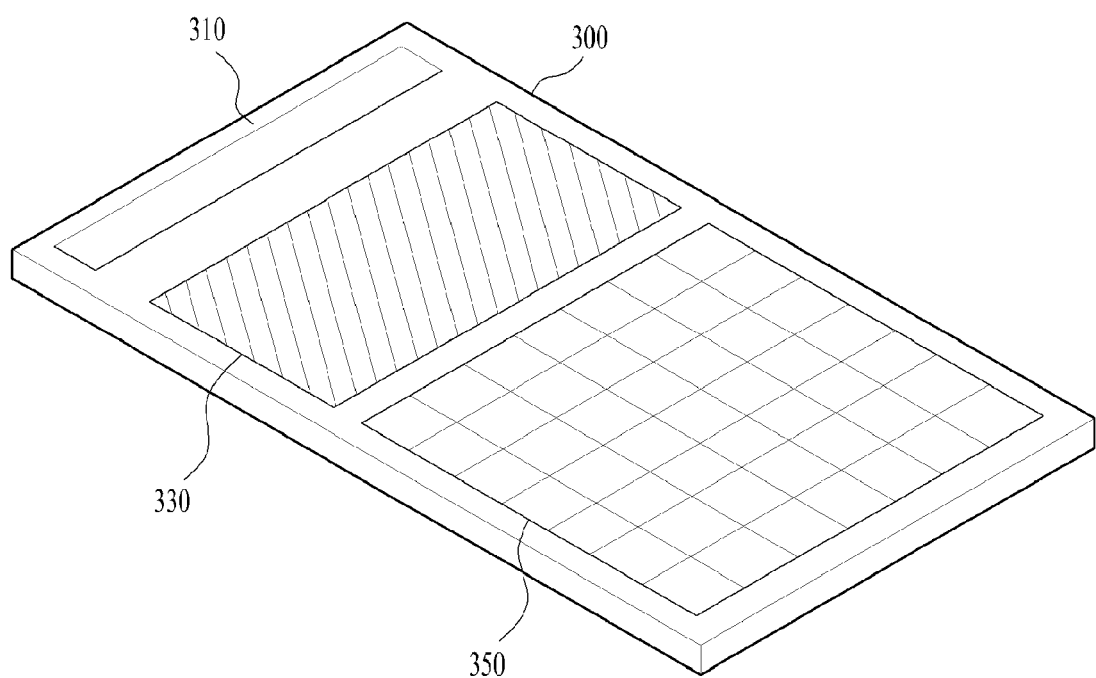
FIG. 8 illustrates a charging board at which a wireless power receiving device can be located according to an exemplary embodiment of the present invention.

FIG. 8 illustrates a charging board (300) at which a wireless power receiving device (200) can be located according to an exemplary embodiment of the present invention.

It is preferable that the wireless power receiving device (200) according to the present invention is located within a predetermined range (or distance) from the wireless power transmitting device (100). And, most particularly, it is preferable that the wireless power receiving device (200) is located in the charging board (300) of FIG. 8.

As shown in the drawing, the charging board (300) includes a firsthand charge section (330) and a normal charge section (350). Additionally, the charging board (300) may further include a display unit (310) for the user's convenience. The display unit (310) may include at least one of a maximum amount of wireless power that can be supplied by the wireless power transmitting device (100), an amount of wireless power that can currently be additionally supplied, the same of the wireless power receiving device (200), charge-related information of each wireless power receiving device (200), and charge status indication information. Herein, the charge status indication information may include a blue light for indicating the remaining amount of supplied wireless power, a yellow light for indicating that the supplied wireless power remains, yet the remaining wireless power corresponding only to a small amount, and a red light for indicating that the supplied amount of wireless power is in a saturated state. Accordingly, the user may be capable of easily determining the current supplied/charged state. Additionally, the display unit (310) may further include a user interface unit, thereby enabling the user to decide the priority level of each wireless power receiving device (200) through the display unit (310).

At this point, a separate coil may be provided to each of the firsthand charge section (330) and the normal charge section (350), and the transmitting device controller (170) may compare the intensity of the communication signal received from the wireless power receiving device (200), which is placed on the firsthand charge section (330) and the normal charge section (350). Thereafter, depending upon the size of each communication signal, the transmitting device controller (170) may be capable of determining whether the position of the corresponding wireless power receiving device (200) corresponds to the firsthand charge section (330) or to the normal charge section (350). For example, the intensity of the communication signal received from the wireless power receiving device (200), which is placed in the firsthand charge section (330) may be set to be greater than the intensity of the communication signal received from the wireless power receiving device (200), which is placed in the normal charge section (350). At this point, intensity information of the signal between the two coils may be wireless communicated with the wireless power transmitting device (100), so that information can be exchanged. However, the wired communication may also be performed.

The wireless power transmitting device (100) according to the present invention may decide the priority level of each wireless power receiving device (200) by using the following method.

First of all, based upon the determined result of the charge-related information received from each wireless power receiving device (200), it may be determined whether or not each wireless power receiving device (200) has the information on the amount of operation mode power (first profile information). Since the amount of operation mode power corresponds to the amount of power required for the operation of the wireless power receiving device (200) when performing charging, if the amount of operation mode power is not, received by the wireless power receiving device (200), the wireless power receiving device (200) may not be capable of operating due to a lack in the amount of required power. Therefore, the transmitting device controller (170) may assign a higher priority on the amount of operation mode power over the amount of charge mode power. Thus, the transmitting device controller (170) may assign a higher priority level on the wireless power receiving device (200) having the information on the amount of operation mode power over the wireless power receiving device (200) having only the information on the amount of charge mode power.

Meanwhile, when multiple wireless power receiving devices (200), each having the information on the amount of operation mode power, exist, among the multiple wireless power receiving devices (200), the transmitting device controller (170) may assign a higher priority level starting from the wireless power receiving device (200) having passed the authentication step firsthand or having updated the charge-related information firsthand. However, if the remaining amount of wireless power available for supply in the wireless power transmitting device (100) is less than the amount of operation mode power of the wireless power receiving device (200), the transmitting device controller (170) may perform control operations, so that the wireless power cannot be allocated to the corresponding wireless power receiving device (200). This is because, even if the remaining wireless power is allocated to the corresponding wireless power receiving device (200), since the allocated amount of remaining wireless power is less than the amount of power required for the operation of the wireless power receiving device (200), the wireless power receiving device (200) cannot be properly (or adequately) operated.

For example, the first wireless power receiving device (200a) to the third wireless power receiving device (200c) of FIG. 6a and FIG. 6b have been authenticated in a time order starting from the third wireless power receiving device (200c), the first wireless power receiving device (200a), and the second wireless power receiving device (200b). At this point, when each of the first wireless power receiving device (200a) to the third wireless power receiving device (200c) respectively transmits information on the amount of operation mode power of 1, 3, 5 to the wireless power transmitting device (200), the transmitting device controller (170) respectively allocates an amount of wireless power corresponding to 5, 1, 3 Watts in accordance with the authentication order starting from the third wireless power receiving device (200c), the first wireless power receiving device (200a), and the second wireless power receiving device (200b). However, if the total amount of wireless power that can be supplied by the wireless power receiving device (200) is equal to 4 Watts, the wireless power may not be allocated to the third wireless power receiving device (200c), and 1 Watt may be allocated to the first wireless power receiving device (200a), and 3 Watts may be allocated to the second wireless power receiving device (200b).

Meanwhile, the wireless power receiving device (200) may first be charged in accordance with the amount of operation mode power. Thereafter, the remaining amount of wireless power that is available for supply may be allocated in accordance with the following priority level based upon the information on the amount of charge mode power (second profile information to fourth profile information).

As described above in FIG. 5b, one wireless power receiving device (200) may have one or more information on the amount of charge mode power, and such at least one information on the amount of charge mode power may correspond to at least one of a slow charge mode, a normal (or general) charge mode, and a fast charge mode.

In case of the first exemplary embodiment of the present invention, the transmitting device controller may assign a highest priority level to a wireless power receiving device (200) requiring the smallest amount of power among the multiple information on the amount of charge mode power. More specifically, when the first wireless power receiving device (200a) includes [1, 3, 0] for each of the second to fourth profile information, when the second wireless power receiving device (200b) requires [2, 4, 6] for each of the second to fourth profile information, and when the third wireless power receiving device (200c) requires [5, 0, 0], and if the remaining amount of wireless power available for supply of the wireless power transmitting device (100) is equal to 6, 3 Watts may be allocated to the first wireless power receiving device (200a), and 2 Watts may be allocated to the second wireless power receiving device (200b).

If the same wireless power is required by a predetermined profile information, the present invention assigns the highest priority level to a wireless power receiving device (200) having a small wireless power requirement value in the next fast mode. More specifically, for example, when the first wireless power receiving device (200a) includes [2, 3, 0], when the second wireless power receiving device (200b) includes [2, 4, 0], and when the remaining amount of wireless power available for supply in the wireless power transmitting device (100) is equal to 2, the highest priority level may be assigned to the first wireless power receiving device (200a), thereby supplying the wireless power to the first wireless power receiving device (200a).

For example, a case when information on the amount of charge mode power of the first wireless power receiving device (200a) respectively includes [1, 2, 3], when information on the amount of charge mode power of the second wireless power receiving device (200b) respectively includes [2, 4, 5], and when the remaining amount of wireless power available for supply in the wireless power transmitting device (100) is equal to 6, will be assumed. At this point, in case of the first exemplary embodiment of the present invention, it may be stated that 0 Watt is already allocated to each of the first wireless power receiving device (200a) and the second wireless power receiving device (200b), before the wireless power is allocated by the transmitting device controller (170). Additionally, the transmitting device controller (170) selects 1, which corresponds to the lowest amount of power among each of the information on the amount of charge mode power, so that 1 Watt and 0 Watt can be respectively allocated to the first wireless power receiving device (200a) and the second wireless power receiving device (200b). Thereafter, since 0 is allocated to the next second wireless power receiving device (200b), the transmitting device controller (170) may select 2, which corresponds to the lowest amount of power of the second wireless power receiving device (200b), so that 1 Watt and 2 Watts can be respectively allocated to the first wireless power receiving device (200a) and the second wireless power receiving device (200b). Subsequently, the transmitting device controller (170) may select 2, which corresponds to the next lowest amount of power, so that 2 Watts can be allocated to each of the first wireless power receiving device (200*a*) and the second wireless power receiving device (200*b*). Then, among the remaining information on the amount of charge mode power, since the lowest amount of power is equal to 3, finally, 3 Watts and 2 Watts are respectively allocated to the first wireless power receiving device (200*a*) and the second wireless power receiving device (200*b*). Thereafter, the next lowest amount of power is equal to 4 Watts, which can be allocated to the second wireless power receiving device (200*b*). However, in this case, since the remaining amount of wireless power available for supply in the wireless power transmitting device (100) exceeds 6, such allocation is not authorized.

Meanwhile, in case of a second exemplary embodiment of the present invention, the transmitting device controller (170) may assign a highest priority level to a wireless power receiving device having a low ratio between a power amount that is to be currently allocated and a maximum power amount that can be allocated. Additionally, if the ratio between the power amount that is to be currently allocated and the maximum power amount that can be allocated is identical, the transmitting device controller (170) may either assign a highest priority level to a wireless power receiving device having a low ratio between a power amount that is to be additionally allocated and the maximum power amount that can be allocated, or may assign a highest priority level to a wireless power receiving device having a maximum amount of power that can be allocated.

For example, a case when information on the amount of charge mode power of the first wireless power receiving device (200*a*) respectively includes [1, 2, 3], when information on the amount of charge mode power of the second wireless power receiving device (200*b*) respectively includes [2, 4, 5], and when the remaining amount of wireless power available for supply in the wireless power transmitting device (100) is equal to 6, will be assumed. In this case, the ratio between the amount of power that is to be allocated and the maximum amount of power that can be allocated in the first wireless power receiving device (200*a*) may respectively have the values of [⅓, ⅔, 1], and the same ratio in the second wireless power receiving device (200*b*) may respectively have the values of [⅖, ⅘, 1]. Herein, in case of the second exemplary embodiment of the present invention, it may be stated that 0 Watt is already allocated to each of the first wireless power receiving device (200*a*) and the second wireless power receiving device (200*b*), before the wireless power is allocated by the transmitting device controller (170). Additionally, the transmitting device controller (170) selects ⅓, which corresponds to the power amount having the lowest ratio between the power amount that is to be allocated and the maximum power amount that can be allocated, among each of the information on the amount of charge mode power, so that 1 Watt and 0 Watt can be respectively allocated to the first wireless power receiving device (200*a*) and the second wireless power receiving device (200*b*). Thereafter, since 0 is allocated to the next second wireless power receiving device (200*b*), the transmitting device controller (170) may select 2, which corresponds to the lowest ratio value ⅖ in the second wireless power receiving device (200*b*), so that 1 Watt and 2 Watts can be respectively allocated to the first wireless power receiving device (200*a*) and the second wireless power receiving device (200*b*). Subsequently, the transmitting device controller (170) may select 2, which corresponds to the power amount corresponding to the next lowest ratio, so that 2 Watts can be allocated to each of the first wireless power receiving device (200*a*) and the second wireless power receiving device (200*b*). Then, since the power amount corresponding to the next lowest ratio ⅘ is equal to 4, 2 Watts and 4 Watts are respectively allocated to the first wireless power receiving device (200*a*) and the second wireless power receiving device (200*b*).

In case of a third exemplary embodiment of the present invention, the transmitting device controller (170) may calculate a time remaining until charging of the charging unit (290) is completed, thereby assigning priority levels in accordance with the remaining time.

Meanwhile, as shown in FIG. 8, when a firsthand charge section (330) and a normal charge section (350) are included in the charging board (300), a wireless power receiving device (200) located in the normal charge section (350) is charged at a higher priority level over a wireless power receiving device (200) located in the firsthand charge section (330). In this case, in case of a preferred exemplary embodiment of the present invention, the transmitting device controller (170) may assign a highest priority level to the information on the amount of operation mode power of the wireless power receiving device (200) located in the firsthand charge section (330), and, then, the transmitting device controller (170) may assign a next highest priority level to the information on the amount of operation mode power of the wireless power receiving device (200) located in the normal charge section (350). Additionally, the transmitting device controller (170) may assign a highest priority level to the information on the amount of charge mode power of the wireless power receiving device (200) located in the normal charge section (350), and, then, the transmitting device controller (170) may assign a next highest priority level to the information on the amount of charge mode power of the wireless power receiving device (200) located in the firsthand charge section (330).

However, as described above, the user may directly assign priority levels to each wireless power receiving devices (200), so as to distribute the wireless power.

As described above, the transmitting device controller (170) of the wireless power transmitting device (100) according to the present invention may receive a power profile signal having communication-related information from multiple wireless power receiving devices (200), and, then, based upon the position where each power profile signal and/or wireless power receiving device (200) is placed, the transmitting device controller (170) may decide the priority levels for each wireless power receiving device (200), so as to allocate the wireless power. Accordingly, the wireless power transmitting device (100) according to the present invention may efficiently allocate a limited amount of wireless power available for supply, thereby being capable of transmitting the allocated wireless power to the corresponding wireless power receiving device (200).

Although a description of the preferred exemplary embodiment of the present invention is provided above, it will be apparent that the present invention will not be limited only to the exemplary embodiment described above, and it will also be apparent that the present invention may be diversely modified and changed without deviating from the technical scope and spirit of the present invention and the appended drawings of the present invention, and that such modification and change will also be included in the scope and spirit of the present invention.

What is claimed is:

1. A wireless power transmitting device for transmitting power wirelessly, the wireless power transmitting device comprising:

a signal processing unit processing a signal;

a wireless transceiver configured to output a wireless power to an external device, and communicate with the external device;

a controller configured to:

control a detection signal for detecting at least one external device to be transmitted via the wireless transceiver, if an authentication request signal is received from the external device in response to the detection signal, control an authentication response signal comprising an ID (Identification) assigned to the external device to be transmitted to the external device via the wireless power transmitter, if a power profile signal, comprising power amount information of the external device and change information indicating whether the power amount information is changed, is received from the external device, control an allocation signal comprising wireless power allocation information indicating an allocated slot, determined based on the power amount information, to the external device, wherein the controller is further configured to:

if the change information indicates that the power amount information is not changed, skip receiving the power amount information of the power profile signal such that a previous power amount information is maintained, and if the change information indicates that the power amount information is changed, receive the power amount information and then update the previous power amount information into the decoded power amount information, and wherein if a plurality of power authentication signals are received from each of a first external device and a second external device, the controller is further configured to set priority levels among the first and second external devices based on at least one of the power amount information or the change information of the first and second external devices.

2. The wireless power transmitting device of claim 1, wherein the detection signal includes a sync signal being transmitted with a predetermined time interval.

3. The wireless power transmitting device of claim 1, wherein the controller is further configured to control the wireless transceiver to output the wireless power to the external device through the slot allocated to the external device.

4. The wireless power transmitting device of claim 1, wherein the power amount information includes at least one of operation mode power amount information required for an operation of the external device or charge mode power amount information required for charging the external device.

5. The wireless power transmitting device of claim 4, wherein the controller is further configured to control one of the first and second external devices who has the operation mode power amount information to have a higher priority than the other external devices who do not have the operation mode power amount information.

6. The wireless power transmitting device of claim 5, wherein if both the first and second external devices have the operation mode power amount information, the controller is further configured to control one of the first and second external devices whose the change information indicates that the power amount information changed to have a higher priority than the other.

7. The wireless power transmitting device of claim 5, wherein if both the first and second external devices have the operation mode power amount information, the controller is further configured to set the priority levels of the external devices based on allocation order of the ID allocated thereto.

8. A wireless power transmitting method for transmitting power wirelessly, the method comprising:

transmitting a detection signal for detecting an external device;

receiving an authentication request signal from the detection signal in response to the detection signal;

transmitting an authentication response signal comprising an ID (Identification) assigned to the external device;

receiving a power profile signal comprising power amount information of the external device and change information indicating whether the power amount information is changed from the external device; and transmitting an allocation signal comprising wireless power allocation information indicating an allocated slot, determined based on the power amount information, to the external device, wherein if the change information indicates that the power amount information is not changed, the power amount information of the power profile signal is not received such that a previous power amount information is maintained, and if the change information indicates that the power amount information is changed, the power amount information is received and then the previous power amount information is updated into the decoded power amount information, and wherein if a plurality of power authentication signals are received from each of a first external device and a second external device, priority levels among the first and second external devices is set based on at least one of the power amount information or the change information of the first and second external devices.

9. The method of claim 8, wherein the detection signal includes a sync signal being transmitted with a predetermined time interval.

10. The method of claim 8, wherein the power amount information includes at least one of operation mode power amount information required for an operation of the external device or charge mode power amount information required for charging the external device.

11. The method of claim 10, wherein, one of the first and second external devices who has the operation mode power amount information has a higher priority than the other external devices who does not have the operation mode power amount information.

12. A wireless power receiving device for receiving power wirelessly, the wireless power receiving device comprising:

a signal processing unit processing a signal;

a wireless power transceiver configured to receive a wireless power from an external device, and communicate with the external device;

a controller configured to:

if a detection signal is received from the external device, control an authentication request signal to be transmitted to the external device via to the wireless transceiver, if an authentication response signal comprising an ID (Identification) assigned by the external device is received, control a power profile signal comprising power amount information and change information indicating whether the power amount information is changed to be transmitted to the external device, and if an allocation signal comprising wireless power allocation information indicating an allocated slot, determined based on the power amount information, is received from the external device control the wireless power receive to receive the wireless power through the allocated slot, wherein the controller is further configured to set a value of the change information of the power profile signal whether the power amount information has been updated, and wherein if another power receiving device is detected by the external device, priority level of the power receiving device among a plurality of power receiving devices is determined by comparing at least one of the power amount information or the change information of the power receiving devices.

13. The wireless power receiving device of claim 12, wherein the power amount information comprises at least one of operation mode power amount information required for its own operation or charge mode power amount information required for charging itself.

14. A wireless power receiving method for receiving power wirelessly, the method comprising:
  receiving a detection signal from an external device;
  transmitting an authentication request signal to the external device in response to the receipt of the detection signal;
  receiving an authentication response signal comprising an ID (Identification) assigned by the external device;
  transmitting a power profile signal comprising power amount information and change information indicating whether the power amount information is changed to the external device;
  receiving an allocation signal comprising wireless power allocation information indicating an allocated slot, determined based on the power amount information, from the external device; and
  receiving the wireless power through the allocated slot from the external device, wherein a value of the change information of the power profile signal is set based on whether the power amount information has been updated, and wherein if another power receiving device is detected by the external device, a priority level of the power receiving device among a plurality of power receiving devices is determined by comparing at least one of the power amount information or the change information of the power receiving devices.

15. The method of claim 14, wherein the power amount information comprises at least one of
  operation mode power amount information required for its own operation or power amount information required for charging itself.

16. The wireless power transmitting device of claim 2, wherein the controller is further configured to control the wireless transceiver to output the wireless power to the external device through the slot allocated to the external device.

17. The wireless power transmitting device of claim 2, wherein the power amount information includes at least one of operation mode power amount information required for an operation of the external device or charge mode power amount information required for charging the external device.

18. The wireless power transmitting device of claim 17, wherein the controller is further configured to control one of the first and second external devices who has the operation mode power amount information to have a higher priority than the other external devices who do not have the operation mode power amount information.

19. The method of claim 9, wherein the power amount information includes at least one of operation mode power amount information required for an operation of the external device or charge mode power amount information required for charging the external device.

* * * * *